F. D. GEARHART.
FAT CUTTING MACHINE.
APPLICATION FILED JUNE 8, 1911.
1,004,641.
Patented Oct. 3, 1911.
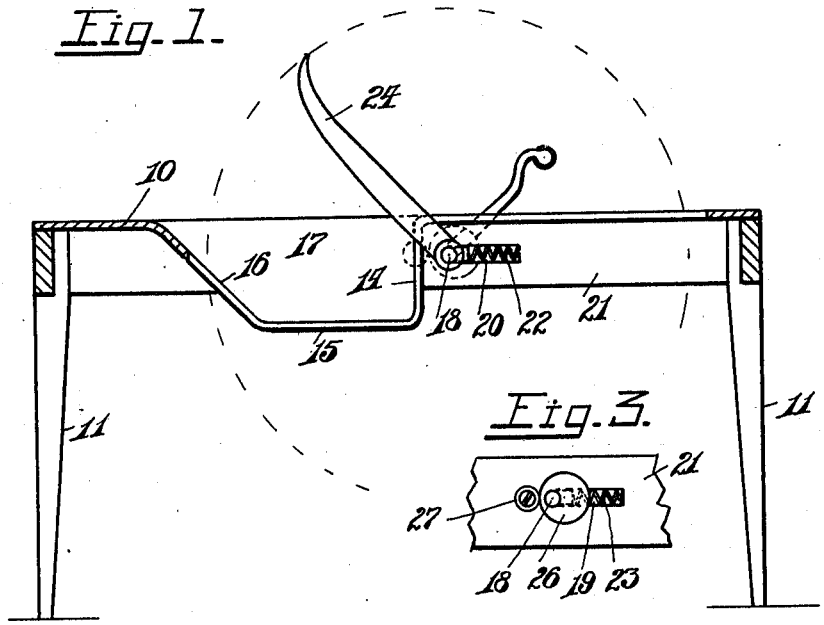
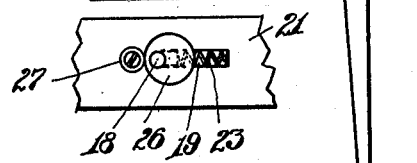
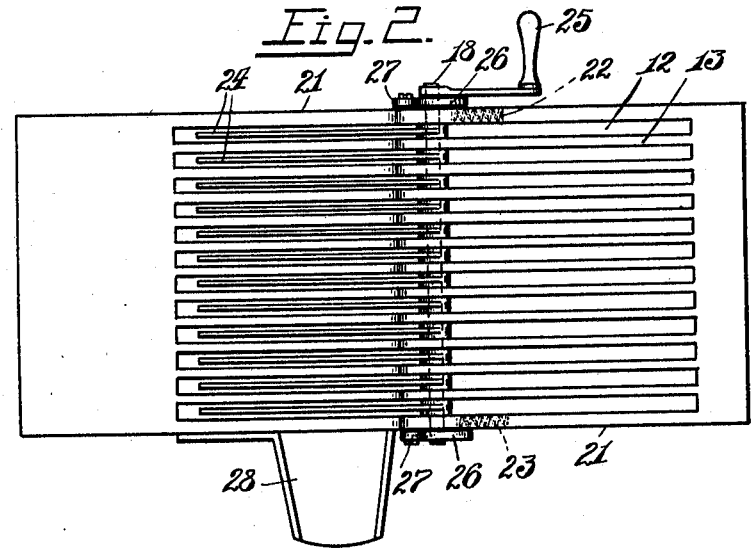
FRANK D. GEARHART.
INVENTOR.
WITNESSES:
F. P. Everett.
F. E. Whitehall
BY George J. Oltsch,
ATTORNEY.

UNITED STATES PATENT OFFICE.

FRANK D. GEARHART, OF OLIVE TOWNSHIP, ST. JOSEPH COUNTY, INDIANA.

FAT-CUTTING MACHINE.

1,004,641. Specification of Letters Patent. Patented Oct. 3, 1911.

Application filed June 8, 1911. Serial No. 631,931.

*To all whom it may concern:*

Be it known that I, FRANK D. GEARHART, a citizen of the United States, residing in Olive township, in the county of St. Joseph and State of Indiana, have invented certain new and useful Improvements in Fat-Cutting Machines, of which the following is a specification.

This invention relates to fat cutting machines.

One object is to provide a means for cutting fat, preparatory to converting the fat into lard, embodying such characteristics that the fat may be efficiently cut by rotary knives which have a draw-cut on their down stroke during their rotation.

Another object is to provide a simple, inexpensive, durable and efficient machine for the purpose stated, embodying a receptacle for the fat and means rotatable through the receptacle with the means having a pulling action during a portion of the rotatable stroke.

With the above and other objects in view the present invention consists in the combination and arrangement of parts hereinafter more fully described, illustrated in the accompanying drawings and particularly pointed out in the appended claims, it being understood that changes may be made in the form, proportion and minor details without departing from the spirit or sacrificing any of the advantages of the invention.

In the drawings: Figure 1 is a central longitudinal sectional view of the machine, Fig. 2 is a plan view thereof, and Fig. 3 is a fragmentary view showing a detail of one of the means used for shifting the axis of the rotatable knives.

Referring now more particularly to the accompanying drawings, the reference character 10 represents a table top supported on suitable legs 11. The top, in the present instance, is provided preferably with a plurality of longitudinal slots and ribs 12 and 13, respectively, which extend nearly throughout the length of the top 10, with the ribs 13 adjacent the center of the table being directed downwardly, as at 14, then forwardly as at 15, and finally upwardly on an incline as at 16, to provide a receptacle 17 in which the fat to be cut is placed.

The character 18 indicates a transverse shaft which is journaled preferably in slots 19 and 20 in the sides 21 of the table, and held normally at one end of said slot by means of the helical or other springs 22 and 23, whereby the shaft 18 is slidably mounted or whereby it has a yieldable bearing in the sides 21 of the table.

Secured to the shaft 18 and rotatable therewith through the slots 12 are a plurality of knives 24, which may be rotated with the shaft by means of a suitable crank handle 25 secured to one end of the shaft.

By manipulation of the handle 25, the shaft 18 is rotated causing the knives to pass through the slots 12 and through the receptacle 17 for the purpose of cutting the fat placed in the receptacle to be cut; and, in order to impart a draw-cut to the knives on their down stroke, there are fixedly secured to the ends of the shaft 18 the cams 26, which are adapted to engage the rollers 27 secured to the outer faces of the sides 21 of the table in alinement with the cams. Thus, on the down stroke of the knives, the cams 26 engage the rollers 27 and cause the shaft 18 to move in the slots 19 and 20 against the action of the springs 22 and 23, thereby effecting a combined rotary and pulling action on the knives at the time they pass through the receptacle.

After the fat is cut into sufficiently small particles, it may be scraped into the chute 28 by the use of any suitable means for delivery into a receptacle (not shown).

From the foregoing it will be seen that I provide a slidable and yielding bearing for the shaft on which the knives are mounted, and that I provide for a double cutting action of the knives because of their having a draw-cut action during their rotation on the down stroke.

What is claimed is:—

1. In a machine for cutting fat, a table, a slotted receptacle supported by the table, a shaft rotatably and slidably journaled in the table, knives secured to the shaft and adapted to pass through the slots of the receptacle upon rotation of the shaft, rollers secured to the table, and cams mounted on the shaft and adapted to engage the rollers and slide the shaft when the knives pass through the receptacle, and means whereby the shaft may be rotated.

2. In a machine for cutting fat, a slotted table provided with a slotted fat receiving receptacle, the sides of the table having slots, a shaft mounted in said slots, springs bearing against the shaft to hold the latter normally at one end of the slots, knives on the shaft and adapted to be rotated through the slots of the table and said receptacle, means whereby the shaft may be rotated, a roller on each side of the table adjacent each slot 5 of the table, and a cam secured to each end of the shaft and adapted to engage the rollers to effect a sliding movement of the shaft in the slots against the action of said springs to effect a drawing action on the knives as 10 they are rotated through the receptacle.

3. In a machine for cutting fat, a slotted table provided with a slotted receptacle, the slots of the table and receptacle being in alinement, a shaft journaled in slots in the table, knives secured to the shaft, yielding 15 means for normally holding said shaft at one end of the slots, means coöperating with the shaft to shift the same in its slots upon the downward movement of the knives, and means for rotating the shaft. 20

In testimony whereof I affix my signature in presence of two witnesses.

FRANK D. GEARHART.

Witnesses:
F. E. WHITEHALL,
FLOYD A. DEAHL.

Copies of this patent may be obtained for five cents each, by addressing the "Commissioner of Patents, Washington, D. C."